United States Patent [19]
Barley

[11] Patent Number: 5,524,965
[45] Date of Patent: Jun. 11, 1996

[54] CHILD SAFETY SEAT

[75] Inventor: Geoffrey W. Barley, Pitton, England

[73] Assignee: Britax-Excelsior Limited, England

[21] Appl. No.: 215,807

[22] Filed: Mar. 22, 1994

[30] Foreign Application Priority Data

Apr. 3, 1993 [GB] United Kingdom ................... 9306977

[51] Int. Cl.[6] ...................................................... B60N 2/28
[52] U.S. Cl. ................ 297/256.16; 297/256.14; 297/252
[58] Field of Search ........................... 297/256.15, 250.1, 297/256.1, 252, 256.13, 256.14, 256.16, 253, 216.11; 296/63, 64

[56] References Cited

U.S. PATENT DOCUMENTS

| | | | |
|---|---|---|---|
| 3,515,431 | 6/1970 | Grady | 297/250.1 |
| 3,767,259 | 10/1973 | Blake et al. | 297/256.15 X |
| 3,861,742 | 1/1975 | Leonard et al. | 297/253 X |
| 4,480,870 | 11/1984 | von Wimmersperg | |
| 4,915,446 | 4/1990 | Darling et al. | 297/256.14 |
| 5,052,750 | 10/1991 | Takahashi et al. | 297/256.16 X |

FOREIGN PATENT DOCUMENTS

| | | |
|---|---|---|
| 503602 | 3/1977 | Australia . |
| 0164909 | 12/1985 | European Pat. Off. . |
| 0270035 | 6/1988 | European Pat. Off. ............ 297/250.1 |
| 0485121 | 5/1992 | European Pat. Off. . |
| 2652881 | 6/1977 | Germany . |
| 3422695 | 12/1985 | Germany ......................... 297/216.11 |
| 8901594 | 4/1989 | Germany . |
| 2095543 | 10/1982 | United Kingdom . |
| 2254548 | 10/1992 | United Kingdom . |

*Primary Examiner*—Milton Nelson, Jr.
*Attorney, Agent, or Firm*—Davis, Bujold & Streck

[57] ABSTRACT

A child safety seat has a seat body, a support structure, a first releasable coupling for connecting the support structure to a motor vehicle and a second releasable coupling for connecting the seat body to the support structure. The support structure includes an upwardly facing abutment surface positioned above the seat portion of an adult vehicle seat and in front of the backrest portion thereof, when the first coupling is engaged. The second coupling is arranged to hold the seat body in rigid abutment with the abutment surface on the support structure either so that the seat body is facing forwardly in the vehicle or so that the seat body is facing rearwardly in the vehicle.

9 Claims, 5 Drawing Sheets

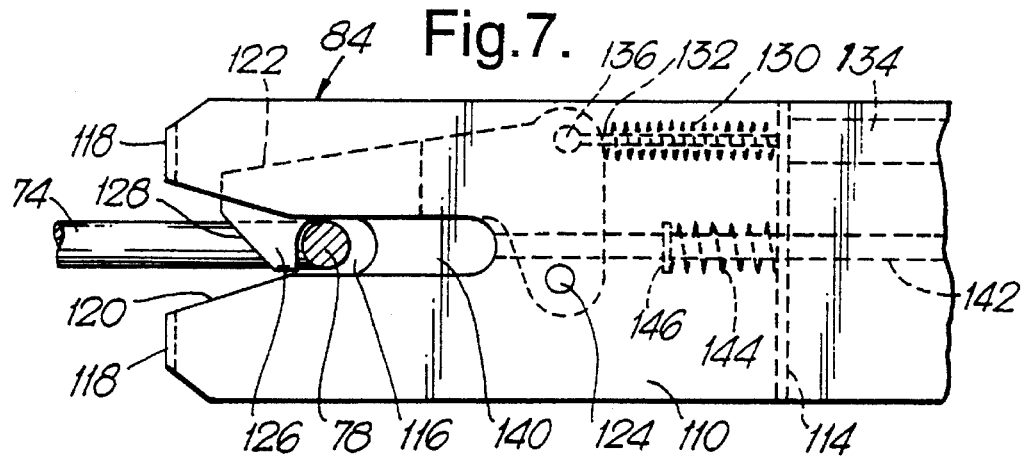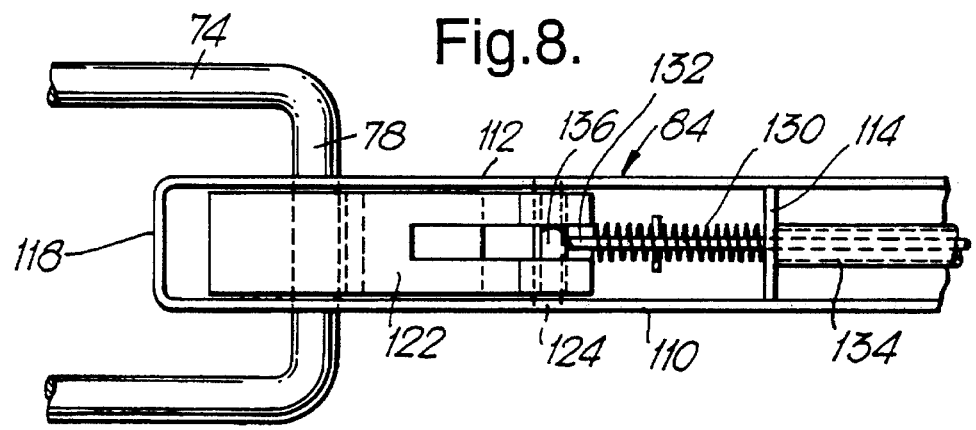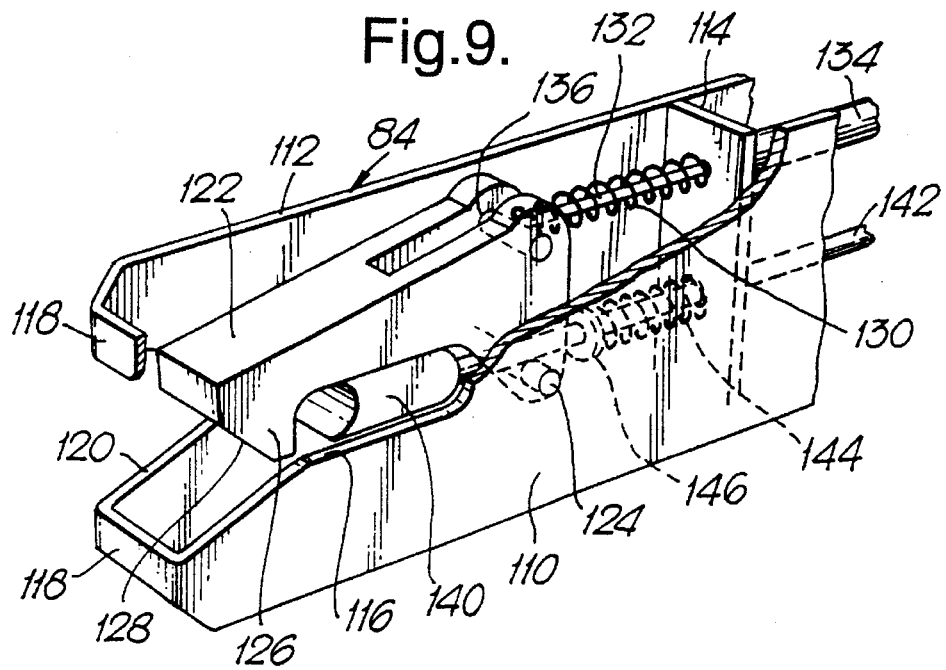

5,524,965

CHILD SAFETY SEAT

FIELD

This invention relates to a child safety seat for use in a vehicle of the type comprising a seat body, a harness for a child occupant of the seat secured to the seat body, a support structure, first releasable coupling means for connecting the support structure to a motor vehicle and second releasable coupling means for connecting the seat body to the support structure.

RELATED ART

A seat of this type is disclosed in GB-A-2254548. The support structure is arranged to be positioned on a vehicle seat and connected thereto by an adult seat belt which serves as the first coupling means. The second coupling means is secured to a backrest portion of the seat body and engages with a portion of the support structure which abuts against the backrest portion of the vehicle seat.

The disadvantage of mounting a child seat in a vehicle by resting it on a vehicle seat and securing in place with straps arises from the inherent resilience of the springs and upholstery of the vehicle seat and also the resilience of the straps themselves. Even if the straps securing the child seat are pulled very tight during installation, such resilience will permit undesirable movement of the child seat relative to the vehicle in the event of sudden deceleration, for example during an accident. In order to overcome this disadvantage, it has been proposed to provide motor cars with standard anchorage units at agreed locations for engagement by releasable connectors which are rigidly coupled to a child's seat. The present invention is concerned with the provision of a child's seat of the type described above for attachment to such anchorage units.

SUMMARY OF THE INVENTION

According to the invention, the support structure includes upwardly facing abutment means positioned above the seat portion of an adult vehicle seat and in front of the backrest portion thereof, when the first coupling means are engaged, and the second coupling means are arranged to hold the seat body in rigid abutment with said abutment means support structure either so that the seat body is facing forwardly in the vehicle or so that the seat body is facing rearwardly in the vehicle.

BRIEF DESCRIPTIONS THE DRAWINGS

FIG. 7 is a side view of a buckle for securing the support structure shown in FIGS. 3–5 to a vehicle;

FIG. 8 is a plan view of the buckle shown in FIG. 7; and

FIG. 9 is a partially broken away perspective view of the buckle shown in FIGS. 7 and 8.

DETAILED DESCRIPTION OF THE PREFERRED EMBODIMENT

Figure 1:
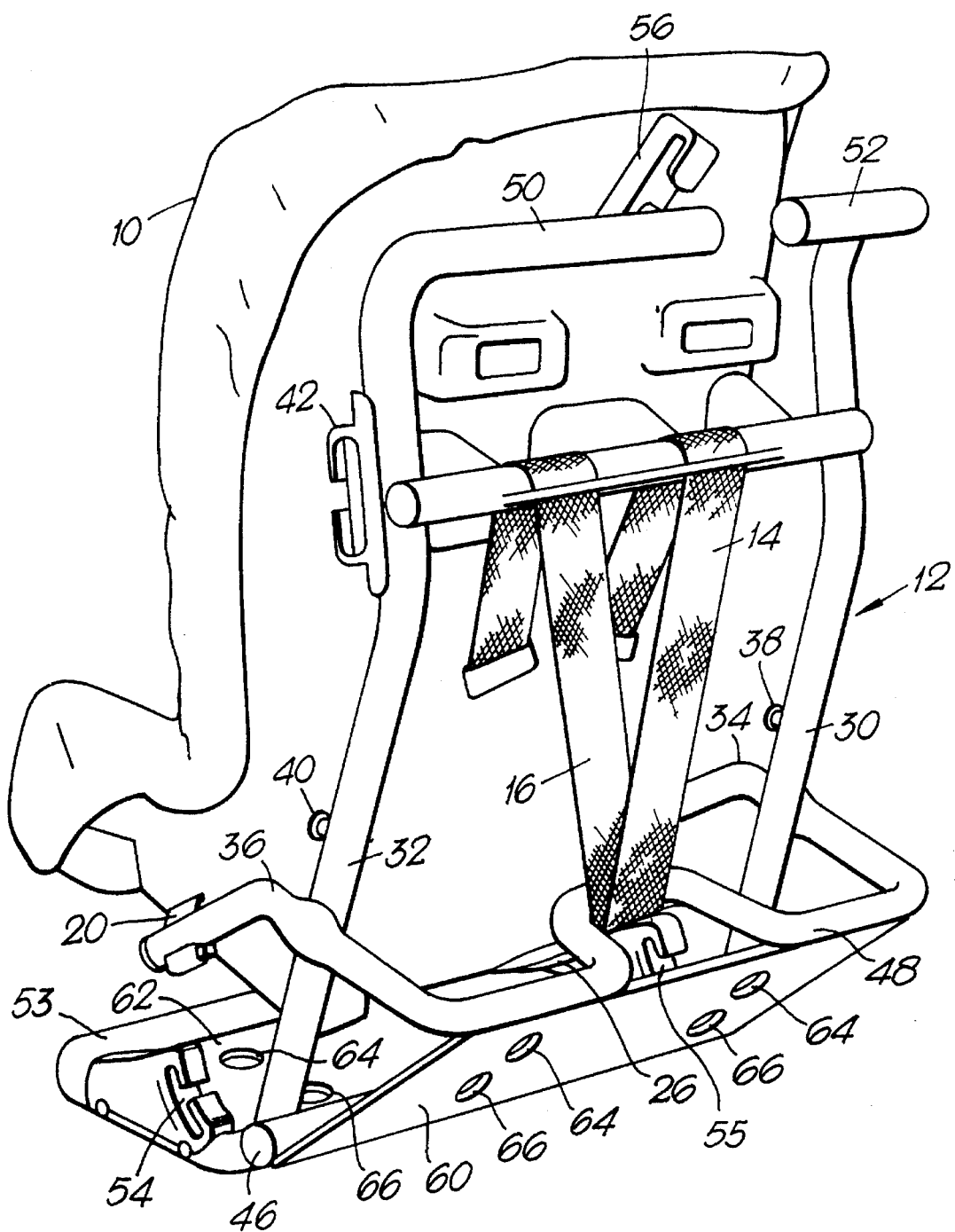
FIG. 1 is a perspective view from behind of a known child's seat modified for use in accordance with the invention.
Figure 2:
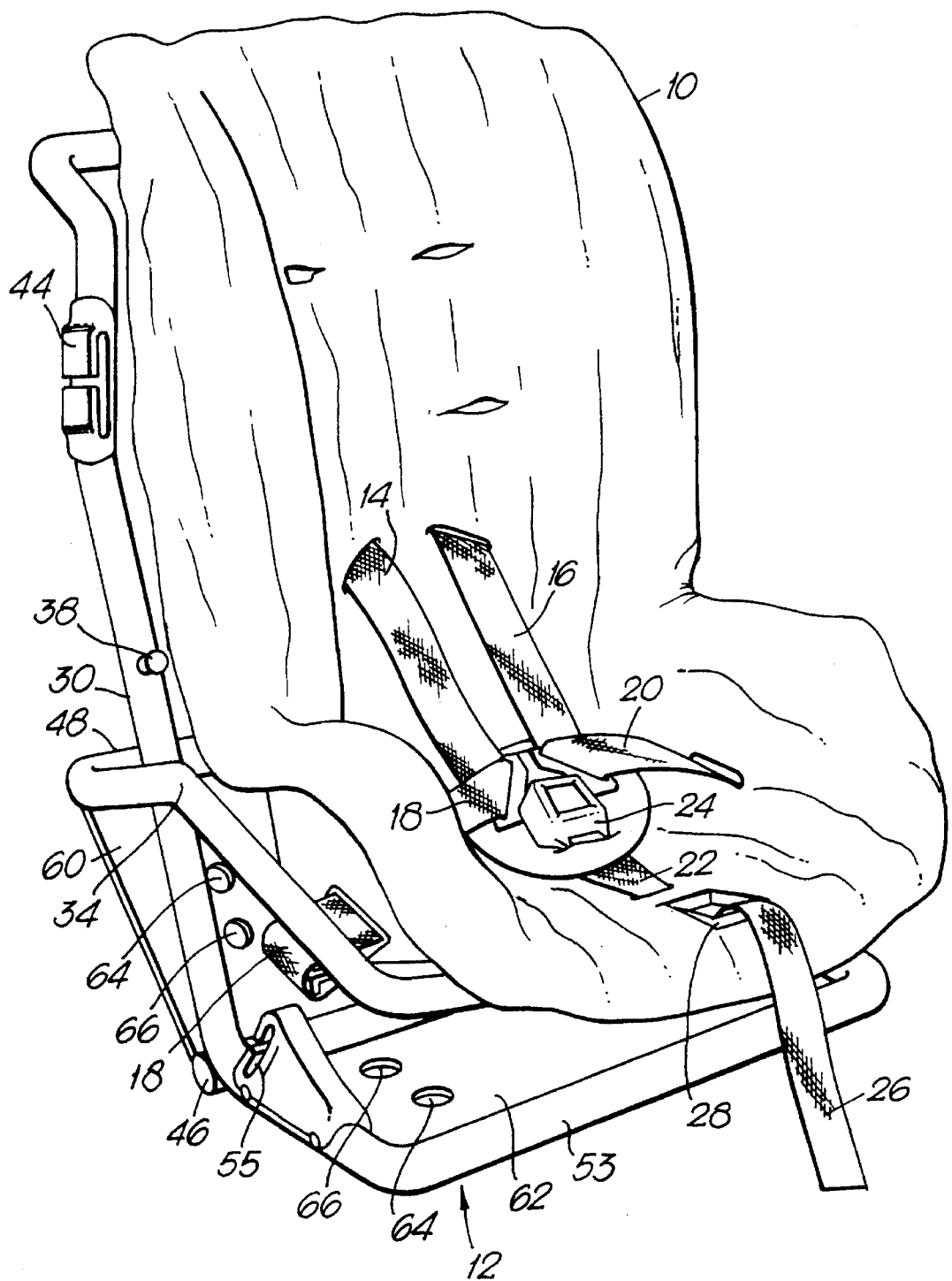
FIG. 2 is a perspective view from in front of the seat shown in FIG. 1.

The child seat shown in FIGS. 1 and 2 comprises a rigid seat shell 10 mounted on a tubular metal frame 12. The seat 10 has a harness for the child consisting of shoulder straps 14 and 16, lap straps 18 and 20 and a crotch strap 22 interconnected by a buckle 24. As described in AU-B-503602, the shoulder straps 14 and 16 are connected behind the seat to an adjuster strap 26 which projects up through a locking device 28 to permit ready adjustment of the harness to fit a child user.

The seat shown in FIGS. 1 and 2 may be fitted into a car in a conventional manner and secured by an adult lap and diagonal seat belt with the child seat either facing forwards or facing rearwards. In the rearward facing orientation, the transverse frame member 53 abuts against the backrest of the adult seat and the transverse members 46 and 48 rest on the seat portion thereof. The lap portion of the adult seat belt engages in the belt guides 54 and 58 while the shoulder strap engages in a pivoting belt guide 56 mounted on the back of the backrest of the seat shell 10.

When the seat is used in the forward facing configuration, the lap strap of the adult belt passes round members 30 and 32 of the frame 12 above frame members 34 and 36 and below belt guides 38 and 40. The shoulder strap of the adult belt passes through a belt guide 42 when the seat is used on the left hand side of the car or through a corresponding belt guide 44 when the seat is used on the right hand side of the car. The transverse members 46 and 53 of the frame 12 rest on the seat portion of the vehicle seat and the upper frame ends 50 and 52 abut against the backrest thereof.

In accordance with the invention, the seat shown in FIG. 1 differs from the known seat described above in that two mounting plates 60 and 62 are secured to the bottom of the frame 12. Each of the mounting plates 60 and 62 has two front fixing holes 64 and two rear fixing holes 66 for a purpose to be explained hereinafter.

Figure 3:
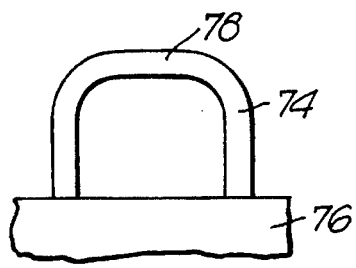
FIG. 3 is a scrap view of an anchorage unit for permanent attachment to a vehicle body.
Figure 4:
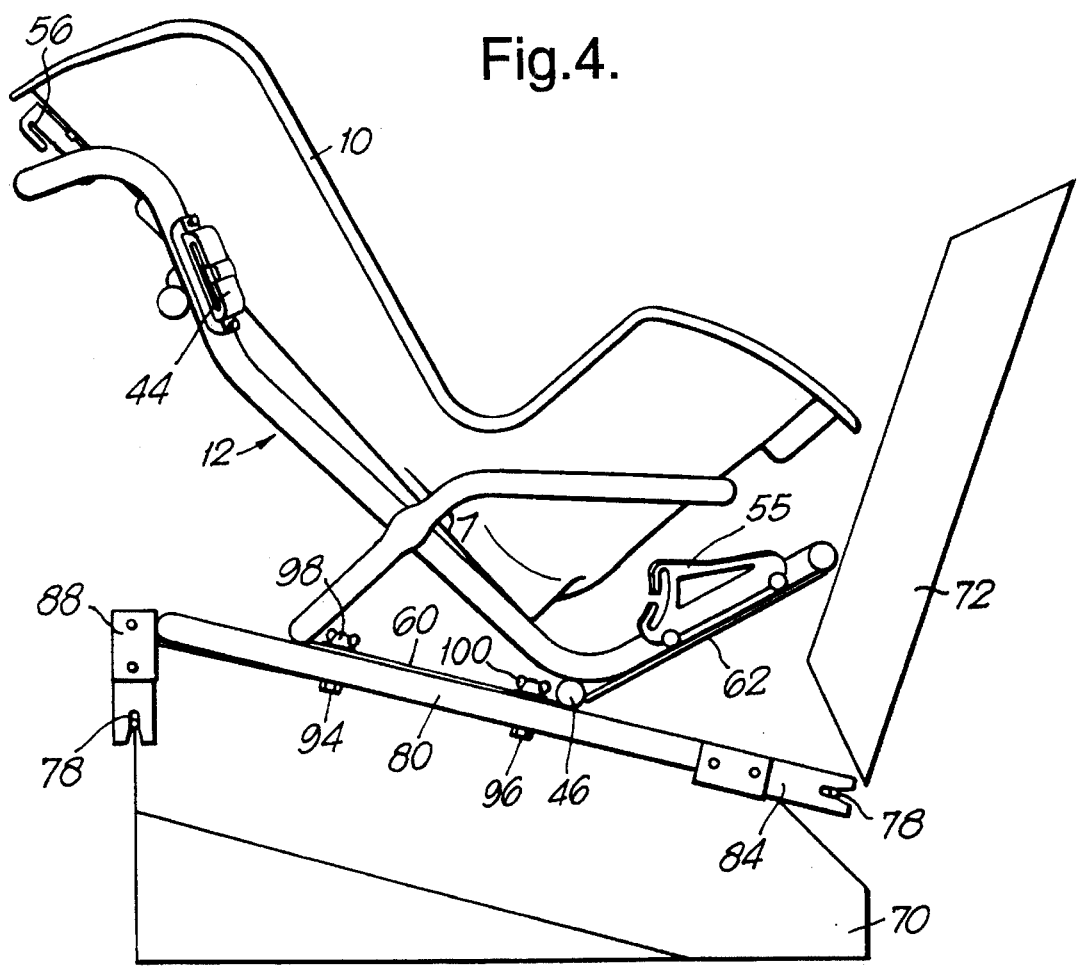
FIG. 4 is a side view and having the child seat shown in FIGS. 1 and 2 mounted in a vehicle in a rearward facing orientation on a support structure in accordance with the invention.

Referring to FIG. 3 and 4, one form of anchorage on which it is proposed to standardise consists of three anchorage units, two of which are accessible between the seat portion 70 and the backrest portion 72 of the adult seat and the third being disposed adjacent to the front edge of the seat portion 70 and below the top surface thereof even when the seat cushion is compressed to its maximum extent. Each anchorage unit includes a generally U-shaped rod like member 74 secured to a part 76 of the vehicle body by the ends of its limbs and with its central portion 78 oriented to extend in a general horizontal direction transversely of the vehicle (see FIG. 4).

Figure 5:
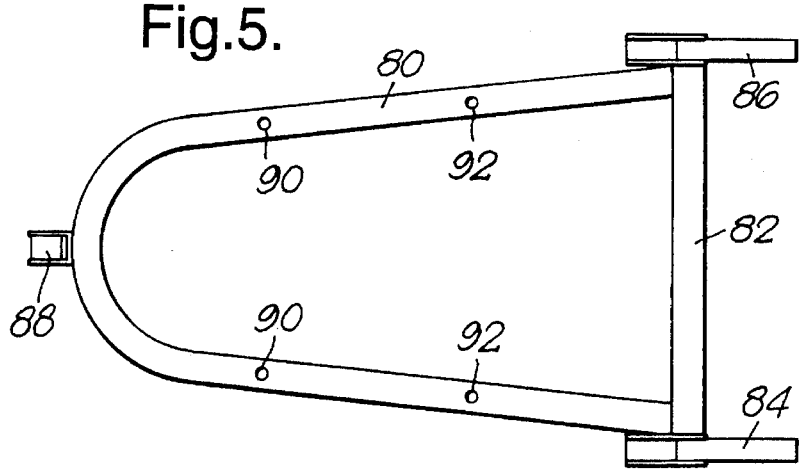
FIG. 5 is a plan view of a support frame constituting the support structure shown in FIG. 4.

FIG. 5 shows a support structure in accordance with the invention in the form of a support frame 80, 82 formed from a generally U-shaped frame member 80 with the ends of its limbs splayed apart from one another and interconnected by a transverse frame member 82. A respective buckle 84, 86 is mounted on each end of the transverse frame member 82. A third buckle 88 is mounted at the junction between the two limbs of the U-shaped member 80. A respective front fixing hole 90 and respective hole 92 each extends vertically through each of the limbs of the U-shaped member 80.

Reverting to FIG. 4, the child seat shown in FIG. 1 is positioned on the support structure with the plate 60 resting on the frame member 80. A respective front fixing hole 64 is in alignment with each of the front fixing holes 90 and a respective rear fixing hole 66 is in alignment with each of the rear fixing holes 92. A respective bolt 94 extends upwardly through each of the front fixing holes 90 and similar bolts 96 extend upwardly through the rear fixing holes 92. The plate 60 is secured to the bolts 94 and 96 by respective wing nuts 98, 100. Next, the support frame 80, 82 is secured to the vehicle by engagement of the buckles 84, 86 and 88 with the transverse portion 78 of their respective anchorage units 74.

Figure 6:
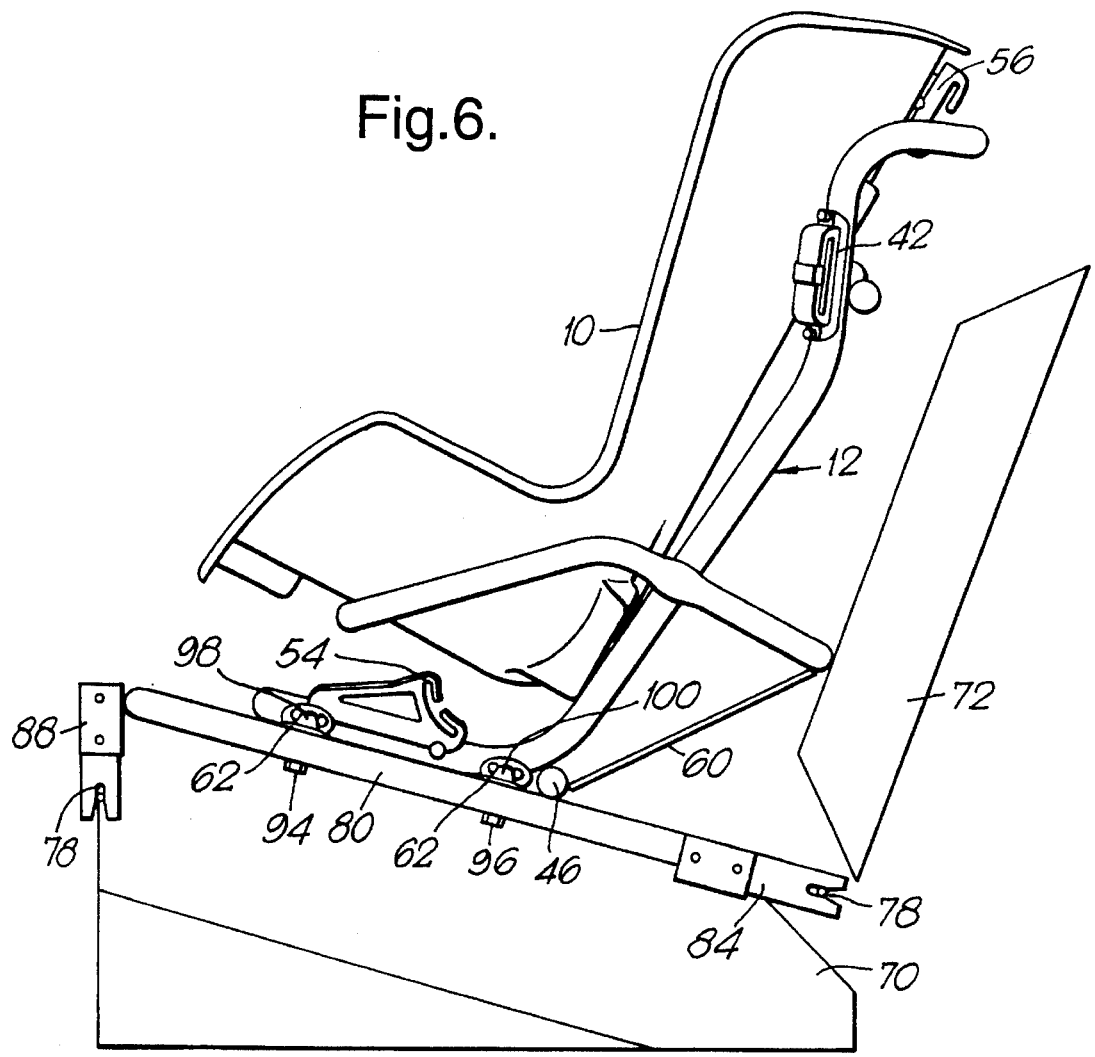
FIG. 6 is a side view, similar to FIG. 4, with the child seat in a forward facing orientation.

When it is desired to convert the seat to its forward facing orientation, the buckles 84, 86 and 88 are first released and the support frame 80, 82 removed from the vehicle. Next, the two front wing nuts 98 and two rear wing nuts 100 are removed from their respective bolts 94, 96 and the seat 10 repositioned so that the plate 62 rests on the frame member 80 and the holes 64 and 66 therein receive the two pairs of bolts 94 and 96. The two pairs of wing nuts 98 and 100 are then replaced to secure the seat in position as shown in FIG. 6 (the part of the frame 12 adjacent to the belt guide 54 being shown partially broken away in FIG. 3 to enable the wing nuts 98 and 100 to be seen). The support frame 80, 82 is then replaced in the vehicle, the buckles 84, 86 and 88 re-engaging with their respective anchorage units.

Since the limbs of the U-shaped member 80 are not parallel to one another, the distance between the front fixing holes 90 is less than the distance between the rear fixing holes 92. Consequently it is impossible to secure the plate 60 to the support frame 80, 82 with the seat forward facing or to secure the plate 62 to the support frame 80, 82 with the seat rearward facing.

A seat of this type is used in the rearward facing orientation for babies weighing up to 10 kg and in the forward facing orientation for children weighing between 9 kg and 18 kg. Consequently, it will normally be changed from the rearward facing orientation to the forward facing orientation only once during the period of time in which it is used by a particular child. On the other hand, the entire seat and support frame may be fitted to and removed from a car on numerous occasions during this period of time.

FIGS. 7 to 9 illustrate the buckle 84 in more detail. A main body is formed from sheet metal bent into a U-shape so as to provide two mutually parallel side walls 110 and 112 having a transverse wall 114 extending therebetween. The ends of the side walls 110 and 112 to the right of the wall 114, as viewed in the drawings, are connected to the frame member 80 (not shown in FIGS. 7 to 9).

Each of the side walls 110 and 112 has an open-ended slot 116 extending through the end wall 118 formed by the portion of the U-shaped body interconnecting the two side walls 110 and 112. Each slot 116 has a flared outer end 120. In use, the transverse part 78 of the corresponding anchorage unit 74 is received in the slots 116 and the flared outer part 120 assists achievement of the correct alignment during insertion.

A latch member 122 is mounted on a pivot pin 124 which extends between the side walls 110 and 112. The latch member 122 has a hook formation 126 which engages round the transverse part 78 of the anchorage unit 74. A cam surface 128 on the outer end hook part 126 displaces the hook part 126 out of the path of the transverse portion 78 during insertion.

The latch member 122 is biassed into its engaged position by a compression spring 130 which engages with the transverse wall 114. The central wire 132 of a Bowden cable 134 extends through the compression spring 130 and is connected to a transverse pin 136 on the latch member 122 so that tension in the wire 132 causes the latch member 122 to disengage.

An ejector 140 is mounted in the slots 116 in the side walls 112 and 114 and has a stem 142 projecting through the transverse wall 114. A compression spring 144, engages between the wall 114 and a flange 146 on the stem 142 so as to bias the ejector 140 outwardly. This ensures that the ejector 140 remains closely in abutment with the transverse part 78 of the anchorage unit 74 when the buckle is fastened (although for clarity of illustration it is shown spaced apart therefrom in FIG. 7). The ejector 140 serves to ensure that, when the latch 122 is released, the transverse part 78 is moved outwardly at least as far as the ramp part 128 of the hook 126.

The buckles 86 and 88 are substantially identical to the buckle 84. The Bowden cables 134 of the three buckles 84, 86 and 88 are connected to a common actuating member so that all three buckles are released simultaneously.

I claim:

1. A child safety seat in combination with an adult vehicle seat for a motor vehicle with a seat portion and a backrest portion the child safety seat comprising:
    a support structure,
    a seat body having first and second abutment surfaces which are alternatively engageable with the support structure to support the seat body at respective first and second angles to the support structure,
    first releasable coupling means arranged to provide a rigid connection between the support structure and the motor vehicle,
    upwardly facing abutment means on the support structure positioned above the seat portion of the adult vehicle seat and in front of the backrest portion thereof,
    second coupling means arranged to hold the first abutment surface in rigid abutment with the support structure only when the seat body is facing rearwardly in the vehicle and to hold the second abutment surface in rigid abutment with the support structure only when the seat body is facing forwardly in the vehicle.

2. A child safety seat in combination with an adult vehicle seat for a motor vehicle, according to claim 1, wherein the seat body comprises a seat shell mounted on a frame.

3. A child safety seat in combination with an adult vehicle seat for a motor vehicle, according to claim 2, further comprising a harness for a child occupant of the seat, said harness being secured to the seat body.

4. A child safety seat in combination with an adult vehicle seat for a motor vehicle, according to claim 1, further comprising a harness for a child occupant of the seat, said harness being secured to the seat body.

5. A child safety seat in combination with an adult vehicle seat for a motor vehicle with a seat portion and a backrest portion, the child safety seat comprising:
    a seat body including a backrest,
    a support structure,
    first releasable coupling means arranged to provide a rigid connection between the support structure and the motor vehicle,
    upwardly facing abutment means on the support structure positioned above the seat portion of the adult vehicle seat and in front of the backrest portion thereof,
    second releasable coupling means on the support structure, first complementary coupling means on the seat body engagable by the second releasable coupling means to hold the seat body in rigid abutment with said abutment means on the support structure only when the seat body is facing forwardly in the vehicle and the backrest thereof is at a first angle to the abutment means, and second complementary coupling means on the seat body engagable by the second releasable coupling means to hold the seat body in rigid abutment with said abutment means on the support structure only when the seat body is facing rearwardly in the vehicle and the backrest thereof is at a second angle to the abutment means.

6. A child safety seat in combination with an adult vehicle seat for a motor vehicle, according to claim 5, wherein the seat body comprises a seat shell mounted on a frame.

7. A child safety seat in combination with an adult vehicle seat for a motor vehicle, according to claim 5, wherein the second releasable coupling means comprises a pair of front coupling formations spaced apart from one another on the support structure by a first lateral distance and pair of rear coupling formations spaced apart from one another on the support structure by a second lateral distance different from the first lateral distance, the first complementary coupling means comprises a first abutment surface having two pairs of complementary formations positioned to engage with said front and rear coupling formations when the seat body is facing forwardly in the vehicle, and the second complementary coupling means comprises a second abutment surface disposed at an angle to said first abutment surface equal to the difference between said first and second angles and having two pairs of complementary formations positioned to engage with said front and rear coupling formations when the seat body is facing rearwardly in the vehicle.

8. A child safety seat in combination with an adult vehicle seat for a motor vehicle, according to claim 7, further comprising a harness for a child occupant of the seat, said harness being secured to the seat body.

9. A child safety seat in combination with an adult vehicle seat for a motor vehicle, according to claim 8, wherein the seat body comprises a seat shell mounted on a frame.

\* \* \* \* \*

Disclaimer 5,524,965—Geoffrey W. Barley, Pitton, England. CHILD SAFETY SEAT. Patent dated June 11, 1996. Disclaimer filed August 7, 1998, by the assignee, Britax-Excelsior Limited.

Hereby enters this disclaimer to claims 1-9 of said patent.

*(Official Gazette,* October 20, 1998)